United States Patent
Park et al.

(10) Patent No.: US 9,571,832 B2
(45) Date of Patent: Feb. 14, 2017

(54) IMAGE ENCODING METHOD AND APPARATUS AND IMAGE DECODING METHOD AND APPARATUS BASED ON MOTION VECTOR NORMALIZATION

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Seung-ho Park, Seoul (KR); Jae-hyun Kim, Seoul (KR); Se-hyeok Park, Seoul (KR); Hyun-wook Park, Daejeon (KR); Hyung-jun Lim, Daejeon (KR)

(73) Assignees: SAMSUNG ELECTRONICS CO., LTD., Suwon-si (KR); KOREA ADVANCED INSTITUTE OF SCIENCE AND TECHNOLOGY, Dajeon-si (KR)

( * ) Notice: Subject to any disclaimer, the term of this patent is extended or adjusted under 35 U.S.C. 154(b) by 392 days.

(21) Appl. No.: 14/327,074

(22) Filed: Jul. 9, 2014

(65) Prior Publication Data

US 2014/0321548 A1     Oct. 30, 2014

Related U.S. Application Data

(63) Continuation of application No. PCT/KR2013/000192, filed on Jan. 9, 2013.
(Continued)

(51) Int. Cl.
H04N 19/00 (2014.01)
H04N 19/51 (2014.01)
(Continued)

(52) U.S. Cl.
CPC ...... *H04N 19/00684* (2013.01); *H04N 19/119* (2014.11); *H04N 19/139* (2014.11);
(Continued)

(58) Field of Classification Search
CPC ... H04N 19/139; H04N 19/513; H04N 19/176
(Continued)

(56) References Cited

U.S. PATENT DOCUMENTS 7,817,185 B2  10/2010 Kurata
2006/0013309 A1  1/2006 Ha et al.
(Continued)

FOREIGN PATENT DOCUMENTS

KR   10-0678949 B1    2/2007
KR   10-2007-0117432 A   12/2007
(Continued)

OTHER PUBLICATIONS

Communication dated Jul. 9, 2014, issued by the Korean Intellectual Property Office in counterpart Korean Application No. 10-2013-0002665.
(Continued)

*Primary Examiner* — Jeffery Williams
(74) *Attorney, Agent, or Firm* — Sughrue Mion, PLLC

(57) ABSTRACT

Provided are an image encoding method and apparatus, and an image decoding method and apparatus. The image encoding method includes: obtaining a variation of a motion estimation error with respect to a homogeneity degree of a motion vector according to mergence, based on a motion vector of each of merged blocks obtained by merging adjacent blocks, motion vectors of the adjacent blocks included in each of the merged blocks, and motion vectors of neighboring blocks of each of the merged blocks; and determining, based on the obtained variation, a merged block having a smallest variation from among the merged
(Continued)

blocks and whether to merge the adjacent blocks included in the determined merged block.

18 Claims, 9 Drawing Sheets

Related U.S. Application Data

(60) Provisional application No. 61/584,386, filed on Jan. 9, 2012.

(51) Int. Cl.
*H04N 19/513* (2014.01)
*H04N 19/52* (2014.01)
*H04N 19/543* (2014.01)
*H04N 19/139* (2014.01)
*H04N 19/176* (2014.01)
*H04N 19/119* (2014.01)
*H04N 19/147* (2014.01)
*H04N 19/192* (2014.01)

(52) U.S. Cl.
CPC ......... *H04N 19/147* (2014.11); *H04N 19/176* (2014.11); *H04N 19/192* (2014.11); *H04N 19/52* (2014.11); *H04N 19/521* (2014.11); *H04N 19/543* (2014.11)

(58) Field of Classification Search
USPC .................................................. 375/240.16
See application file for complete search history.

(56) References Cited

U.S. PATENT DOCUMENTS

| | | | |
|---|---|---|---|
| 2006/0193388 A1* | 8/2006 | Woods | H04N 19/647 375/240.16 |
| 2008/0123747 A1 | 5/2008 | Lee et al. | |
| 2011/0176013 A1 | 7/2011 | Robertson et al. | |

FOREIGN PATENT DOCUMENTS

| | | |
|---|---|---|
| KR | 10-2007-0119525 A | 12/2007 |
| KR | 10-0803611 B1 | 2/2008 |
| KR | 10-0991344 B1 | 11/2010 |

OTHER PUBLICATIONS

Search Report & Written Opinion dated Apr. 22, 2013, issued by the International Searching Authority in counterpart International Application No. PCT/KR2013/000192.

* cited by examiner

IMAGE ENCODING METHOD AND APPARATUS AND IMAGE DECODING METHOD AND APPARATUS BASED ON MOTION VECTOR NORMALIZATION

RELATED APPLICATIONS

This is a continuation application of PCT/KR2013/000192 filed on Jan. 9, 2013 which claims the benefit of U.S. Provisional Application 61/584,386, filed on Jan. 9, 2012, in the United States Patent and Trademark Office, the disclosures of which are hereby incorporated herein in their entirety by reference.

BACKGROUND

1. Field

Exemplary embodiments relate to encoding and decoding of an image, and more particularly, to a method and apparatus for encoding an image and a method and apparatus for decoding an image by using a motion vector of a merged block obtained by merging blocks. Also, exemplary embodiments relate to a method and apparatus for encoding an image and a method and apparatus for decoding an image by splitting an image in units of objects, and performing motion estimation and compensation in the units of objects.

2. Related Art

In an image compression method, such as MPEG-1, MPEG-2, MPEG-4, or H.264/MPEG-4 advanced video coding (AVC), an image is split into several regions (pixel groups) for precise motion estimation, and a motion vector is estimated for each region. A block matching algorithm (BMA) method that is most widely used defines a pixel group in a block shape with respect to a current frame, and estimates a motion vector in units of blocks by searching a previous frame for a most similar block of each block.

Since a motion estimation method, such as a BMA, estimates a motion vector that minimizes a sum of absolute difference (SAD), it is highly likely that actual motion of an object in an image is not accurately estimated. For example, while motion-estimating a block included in a homogeneous object, since it is highly likely that a plurality of blocks similar to a block that is motion-estimated may exist in a previous frame, a motion vector may not accurately reflect actual motion of an object.

Also, since motion estimation is performed in units of blocks having a predetermined size without considering an object included in an image, accuracy and precision of the motion estimation may decrease. For example, since a plurality of regions similar to a block may exist in a previous frame when a size of the block is small compared to an object, a motion vector that is not an actual motion vector may be selected as a final motion vector. Alternatively, when a size of a block is larger than an object, motion estimation may be wrongly performed since the block may include not only pixels of the object but also pixels of a background region.

SUMMARY

Exemplary embodiments relate to obtaining a larger merged block by merging blocks included in the same object and estimating a motion vector based on the obtained merged block, thereby obtaining a motion vector that is similar to actual motion of an object while providing a consistent motion vector field.

Exemplary embodiments also relate to obtaining a more accurate motion vector by performing motion estimation and compensation in units of objects included in an image.

According to one or more exemplary embodiments, it is determined whether to merge adjacent blocks by calculating a cost generated while merging blocks based on a predetermined evaluation function, and a motion vector is estimated with respect to a merged block.

According to one or more exemplary embodiments, an image is split in units of objects obtained by grouping pixels having similar pixel values, and motion estimation and compensation are performed on the image in the units of objects.

According to an aspect of an exemplary embodiment, an image encoding method includes: obtaining motion vectors of blocks forming an image; obtaining merged blocks by merging two adjacent blocks; obtaining a motion vector of each of the merged blocks; obtaining a variation of a motion estimation error with respect to a homogeneity degree of a motion vector according to mergence with respect to each merged block, based on the motion vector of each merged block, motion vectors of blocks included in each merged block, motion vectors of neighboring blocks of each merged block, and motion vectors of neighboring blocks of the blocks included in each merged block; and determining a merged block having the smallest variation from among the merged blocks, and determining whether to merge blocks included in the determined merged block, based on the obtained variation.

According to an aspect of another exemplary embodiment, an image encoding apparatus includes: a motion estimation and compensation unit that obtains motion vectors of blocks forming an image, and a motion vector of each of merged blocks obtained by merging two adjacent blocks; and a block merging unit that obtains a variation of a motion estimation error with respect to a homogeneity degree of a motion vector according to mergence with respect to each merged block, based on the motion vector of each merged block, motion vectors of blocks included in each merged block, motion vectors of neighboring blocks of each merged block, and motion vectors of neighboring blocks of the blocks included in each merged block, and determining, based on the obtained variation, a merged block having the smallest variation from among the merged blocks and whether to merge blocks included in the determined merged block.

According to an aspect of another exemplary embodiment, an image decoding method includes: obtaining information about a merged block obtained by merging at least two adjacent blocks from among blocks forming an image and about a motion vector of the merged block, from a received bitstream; and obtaining an estimation value of the merged block by performing motion compensation on the merged block by using the motion vector, wherein the merged block is obtained by merging the at least two adjacent blocks based on a result of comparing a variation of a motion estimation error with respect to a homogeneity degree of a motion vector according to the merging of the at least two adjacent blocks with a predetermined threshold value.

According to an aspect of another exemplary embodiment, an image decoding apparatus includes: an entropy decoding unit that obtains information about a merged block obtained by merging at least two adjacent blocks from among blocks forming an image and about a motion vector of the merged block, from a received bitstream; and a motion compensation unit that obtains an estimation value of the merged block by performing motion compensation on the merged block by using the motion vector, wherein the merged block is obtained by merging the at least two adjacent blocks based on a result of comparing a variation of a motion estimation error with respect to a homogeneity degree of a motion vector according to the merging of the at least two adjacent blocks with a predetermined threshold value.

According to an aspect of an exemplary embodiment, blocks having a high possibility of being included in the same object may be merged, and thus an image may be split into a few large merged blocks. Such a few large merged blocks may have a similar shape as the object included in the image. Accordingly, a merged block may be generated by merging a small block that is merely a part of an object with other blocks, and motion estimation may be performed on the merged block so as to prevent wrong motion estimation of the small block included in the object and obtain a more accurate motion vector. In other words, by normalizing different motion vectors of blocks in the same object to a motion vector of a merged block, a motion vector that accurately reflects one actual motion of one object may be obtained.

According to one or more exemplary embodiments, motion estimation and compensation are performed in units of objects, and thus the motion estimation and compensation may be more accurately performed even in a boundary region of an object.

According to one or more exemplary embodiments, a more accurate interpolation frame may be generated by using a more accurate motion estimation and compensation process while generating an interpolation frame by using an interpolation method such as motion-compensated frame interpolation (MCFI).

DETAILED DESCRIPTION OF THE EXEMPLARY EMBODIMENTS

Hereinafter, one or more exemplary embodiments will be described in detail with reference to accompanying drawings.

Figure 1:
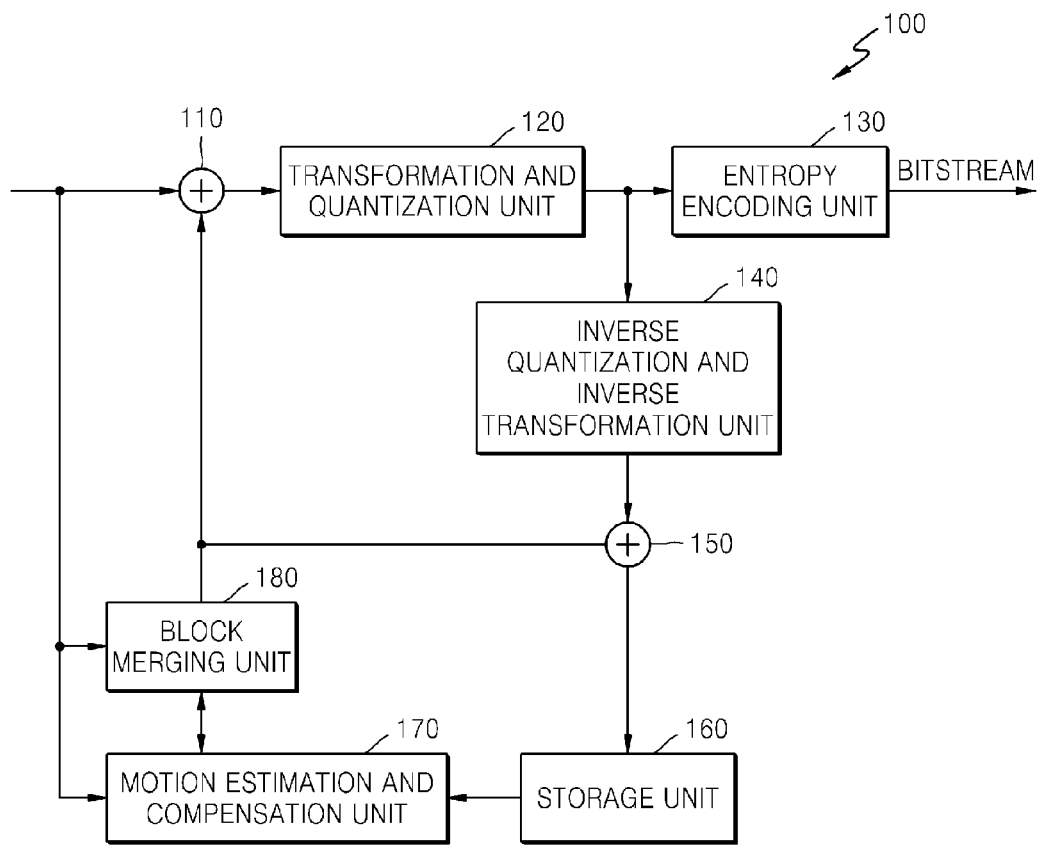
FIG. 1 is a block diagram of a structure of an image encoding apparatus, according to an exemplary embodiment.

FIG. 1 is a block diagram of a structure of an image encoding apparatus, according to an exemplary embodiment. Referring to FIG. 1, an image encoding apparatus 100 includes a subtractor 110, a transformation and quantization unit 120, an entropy encoding unit 130, an inverse quantization and inverse transformation unit 140, an adder 150, a storage unit 160, a motion estimation and compensation unit 170, and a block merging unit 180. An intra prediction unit that is not shown may generate an estimation value of each block by performing intra prediction in units of blocks in an intra prediction mode.

The motion estimation and compensation unit 170 splits an input image into blocks having a predetermined size, and obtains a motion vector of each block by performing motion estimation on each block. Hereinafter, a block described herein may indicate one of a macroblock, a partition obtained by splitting a macroblock, and a coding unit used for high efficiency video coding (HEVC). In detail, the motion estimation and compensation unit 170 according to an exemplary embodiment also obtains a motion vector of a merged block obtained by merging two adjacent blocks from among the blocks forming the image by performing motion estimation on the merged block. As will be described below, the merged blocks may be obtained by merging all combinable two adjacent blocks in the image. A detailed process of estimating the motion vector of the merged block will be described in detail later.

The block merging unit 180 determines whether to merge the blocks included in the merged block. As will be described below, a process of merging blocks, according to an exemplary embodiment, is performed by repeatedly performing a process of selecting and merging a merged block having the minimum cost from among all combinable of merged blocks, based on a predetermined cost function. The block merging unit 180 may calculate a cost of each merged block by reflecting a variation degree between a motion estimation error value by a motion vector of each of original two blocks and a motion estimation error value using the motion vector of the merged block generated by two blocks, and a homogeneity degree of a motion vector according to mergence, which is obtained while processing the two motion vectors of the original two blocks to be uniform with the motion vector of the merged block. In detail, the block merging unit 180 obtains a variation of a motion estimation error with respect to a homogeneity degree of a motion vector according to mergence, based on the motion vector of the merged block, the motion vectors of the blocks included in the merged block, motion vectors of neighboring blocks of the merged block, and motion vectors of neighboring blocks of the blocks included in the merged block. Also, the block merging unit 180 may determine, based on the obtained variation, a merged block having the smallest variation from among the merged blocks and whether to finally merge the blocks by comparing the variation of the determined merged block and a predetermined threshold value. A process of merging the blocks will be described later.

When a final split shape of the image is determined by merging the blocks, the motion estimation and compensation unit 170 obtains and outputs an estimation value of the block or the merged block from a previous reference frame by referring to the motion vector of the block or the merged block.

The subtractor 110 outputs a residual that is a difference between the estimation value and an input value of the block or the merged block. Residual data is output as a quantized transformation coefficient via the transformation and quantization unit 120. The quantized transformation coefficient is restored as the residual data via the inverse quantization and inverse transformation unit 140. The adder 150 adds the restored residual data and the estimation value to generate a restored image, and the restored image is stored in the storage unit 160 to be used as a reference frame of a subsequent image frame. The quantized transformation coefficient may be output as a bitstream via the entropy encoding unit 130. In detail, when the split shape of the image is finally determined via a merging process described later, the entropy encoding unit 130 may add mergence information of the blocks and motion vector information of the merged block to a bitstream obtained by encoding the image.

Hereinafter, a process of merging blocks and a process of normalizing a motion vector, which are performed by the block merging unit 180 of FIG. 1 will be described in detail.

Figure 2:
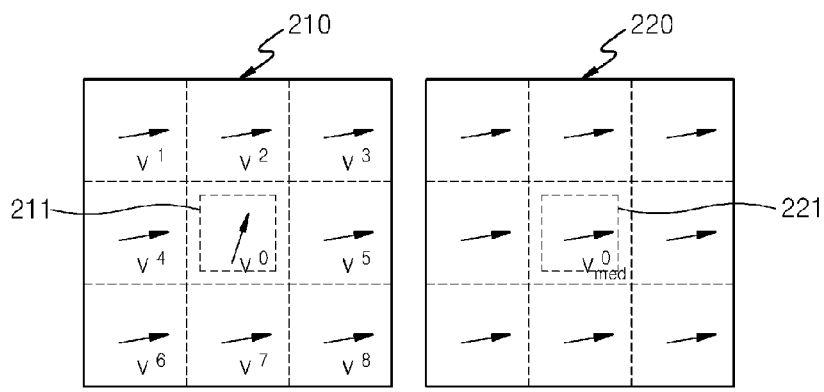
FIG. 2 is a reference diagram for describing a median filtering method for a post-process of a motion vector in technical fields related to the exemplary embodiments.

FIG. 2 is a reference diagram for describing a median filtering method for a post-process of a motion vector in technical fields related to exemplary embodiments. In FIG. 2, a reference numeral 210 denotes an original motion vector field, and a reference numeral 220 denotes a changed motion vector field after a median filtering process.

As described above, in a motion estimation method, such as BMA, since a motion vector that minimizes an SAD value is estimated, it is highly likely that a plurality of similar blocks similar to a block that is motion-estimated may exist in a previous frame while motion-estimating a block included in a homogeneous object, and thus a motion vector may not accurately reflect motion of an actual object. Accordingly, a median filtering method that uses a median of motion vectors of neighboring blocks as a motion vector of a current block may be used so that adjacent blocks have similar motion vectors via a post-process with respect to a motion vector of each of block. Referring to FIG. 2, as shown in the reference numeral 210, it is assumed that 8 motion vector fields are determined around a current block 211. The median filtering method obtains a median motion vector $V^0_{med}$ according to Equation 1 below from motion vectors $V^0$ through $V^8$ of the current block 211 and neighboring blocks, and replaces the motion vector $V^0$ of the current block 211 by the median motion vector $V^0_{med}$.

$$V^0_{med} = \underset{v \in \{V^0, V^1, \ldots V^8\}}{\arg\min} \left\{ \sum_{i=0}^{8} |V^i_x - V^0_x| + |V^i_y - V^0_y| \right\} \quad (1)$$

In Equation 1, $V^i_x$ denotes an x-axis component of a $V^i$ vector, and $V^i_y$ denotes a y-axis component of the $V^i$ vector.

Referring to the reference numeral 220 at the right of FIG. 2, a motion vector of a current block 221 is filtered similar to motion vectors of neighboring blocks according to the median filtering process according to Equation 1.

Such a median filtering method may be helpful in amending a motion vector having a wrong value in a motion vector field that should have similar motion vectors. However, in the median filtering method, a block may have a wrong motion vector when a size of an object is small or the block is near a boundary of the object and a background.

Figure 3:
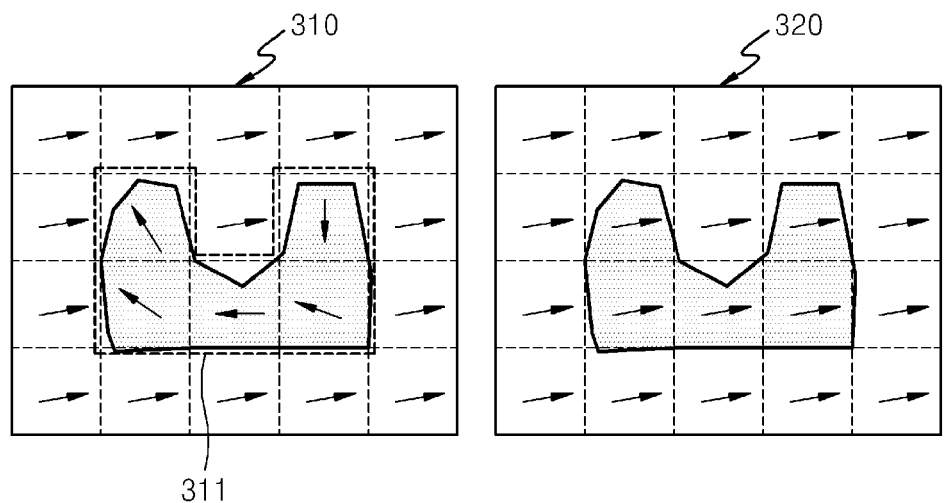
FIGS. 3 and 4 are reference diagrams for describing problems of a median filtering method used in technical fields related to the exemplary embodiments.
Figure 4:
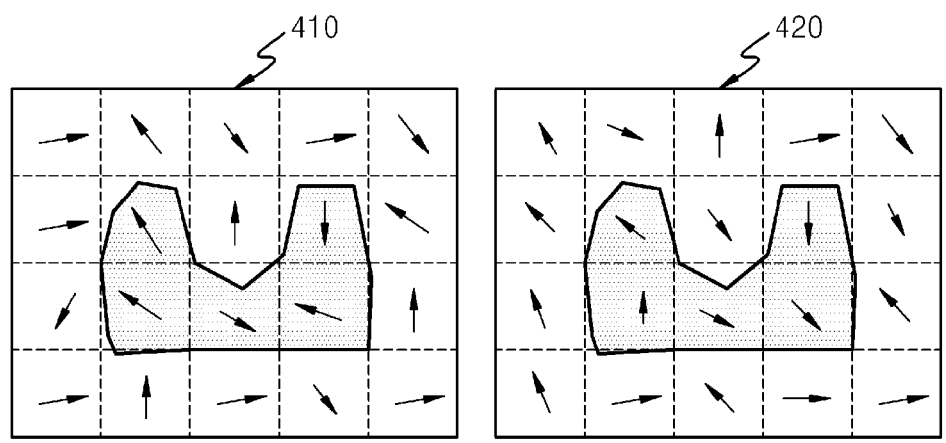

FIGS. 3 and 4 are reference diagrams for describing problems of a median filtering method used in technical fields related to exemplary embodiments. In FIGS. 3 and 4, reference numerals 310 and 410 indicate original motion vector fields, and reference numerals 320 and 420 indicate changed motion vector fields after the median filtering process.

Referring to FIG. 3, when median filtering is performed according to Equation 1 described above with respect to blocks 311 forming an object, a motion vector that was estimated as motion of the object may be changed to a motion vector of a background since there are more blocks included as the background than the object in neighboring blocks. In other words, when the background and the object have different motion, as shown in the reference numeral 320, motion vectors of blocks included in the object are filtered to motion vectors of all neighboring background blocks according to the median filtering method, and thus the blocks included in the object may have motion vectors different from actual motion. Also, referring to FIG. 4, since the median filtering method is based on an assumption that most blocks have accurate motion vectors, when accuracy of motion vectors based on units of blocks is low as shown in the reference numeral 410, wrong motion vectors as shown in the reference numeral 420 cannot be amended after the median filtering.

The block merging unit 180 according to an exemplary embodiment obtains a motion vector close to actual motion of an object, and provides a consistent motion vector field by estimating a motion vector in units of merged blocks obtained by merging blocks in the same object. Blocks included in one object should substantially have the same motion, but since motion estimation is performed in units of blocks, the blocks included in one object may have different motion vectors. Accordingly, the block merging unit 180 generates a uniform vector field from an inhomogeneous motion vector field by estimating a motion vector in units of merged blocks obtained by merging blocks that are highly likely to be included in one object by considering a motion vector of each block according to motion estimation in units of blocks, a motion estimation error of each block, and a motion estimation error of a merged block. The process of merging blocks corresponds to a process of replacing at least two motion vectors with one motion vector of a merged block. In other words, two adjacent blocks are merged via block mergence, and a new motion vector is obtained for the merged block via motion estimation. As such, a uniform vector field is obtained and/or normalization of a motion vector is performed according to block mergence.

Figure 5:
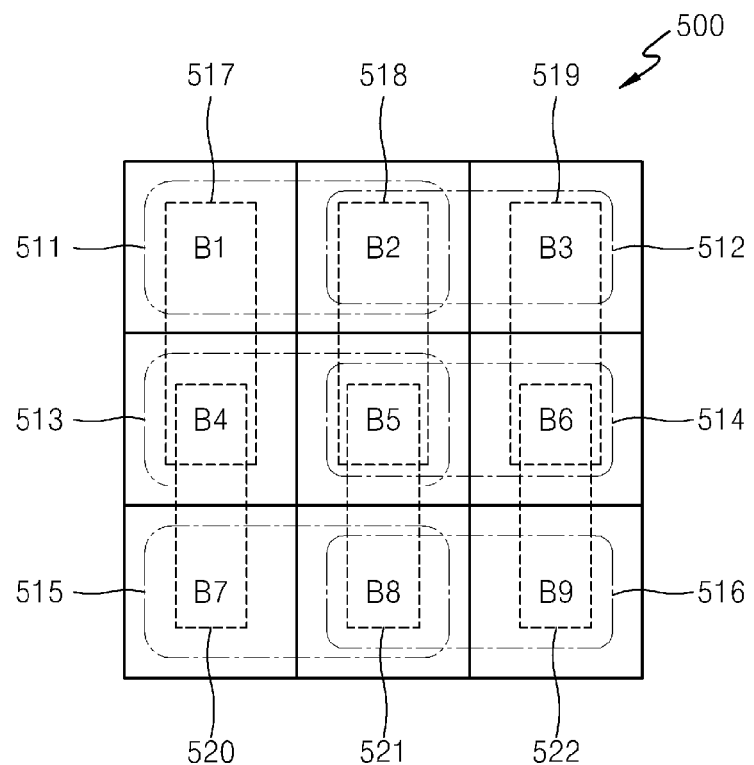
FIG. 5 is a reference diagram for describing a merging process of image blocks, according to an exemplary embodiment.

FIG. 5 is a reference diagram for describing a merging process of image blocks, according to an exemplary embodiment.

The block merging unit 180 performs block mergence by repeatedly performing a process of merging adjacent blocks that are highly likely to be in the same object to one block, based on a motion vector of each block and a motion estimation error value determined by the motion estimation and compensation unit 170.

Referring to FIG. 5, it is assumed that the motion estimation and compensation unit 170 split an image 500 into blocks B1 through B9, and determined motion vectors of the blocks B1 through B9. In FIG. 5, the image 500 may be an entire image frame or a part of the image frame. For convenience of description, it is assumed that one image is split into 9 blocks B1 through B9 and then motion-estimated in FIG. 5.

The block merging unit 180 generates merged blocks 511 through 522 by merging all two adjacent blocks. Then, the block merging unit 180 determines a merged block having a cost having the smallest value by calculating costs of the merged blocks 511 through 522 according to a predetermined evaluation function, and determines whether to actually merge the determined merged block by comparing the cost of the determined merged block and a predetermined threshold value. Here, a cost is determined via an evaluation function set based on information about two blocks included in a block merged to have a small value when the two blocks are included in one object. In other words, the block merging unit 180 obtains the costs of the merged blocks 511 through 522 based on an evaluation function set to have a small value when two blocks are included in one object by using information about two adjacent blocks as a parameter, and finally determines whether to actually merge two blocks included in a merged block having a minimum cost. For example, let's assume that the B1+B2 merged block 511 is a merged block having the minimum cost from among the merged blocks 511 through 522. When the B1+B2 merged block 511 is determined to be the merged block having the minimum cost based on costs according to a predetermined evaluation function, the block merging unit 180 may determine whether to actually merge the blocks B1 and B2 by comparing the cost of the B1+B2 merged block 511 and a predetermined threshold value.

An evaluation function set to have a small value when two blocks are included in one object may be set via one of various methods. For example, the evaluation function may be a function for measuring a variation of a motion estimation error according to a merged block with respect to homogeneity degree of a motion vector, which indicates a difference between a degree of non-homogeneity between a motion vector of a merged block and motion vectors of neighboring blocks of the merged block, and a homogeneity degree between a motion vector of each block included in the merged block and motion vectors of neighboring blocks of each block. In other words, the evaluation function may obtain the cost of each merged block by calculating (variation of motion estimation error by merged block)/(homogeneity degree of motion vector). Reasons why the block merging unit 180 determines whether blocks are included in one object by calculating (variation of motion estimation error by merged block)/(homogeneity degree of motion vector) as such are to obtain uniform motion vectors from inhomogeneous motion vectors by merging blocks that are highly likely to be included in one object while not merging blocks included in different regions, for example, in a background and an object.

A homogeneity degree of a motion vector may be determined by using a motion vector of a merged block, motion vectors of blocks included in the merged block, motion vectors of neighboring blocks of the merged block, and motion vectors of neighboring blocks of the blocks included in the merged block. Also, a variation of a motion estimation error by a merged block may be determined by using a difference between a motion estimation error by a motion vector of the merged block and a motion estimation error by a motion vector of each block included in the merged block. Here, an SAD may be used as a motion estimation error.

Figure 6:
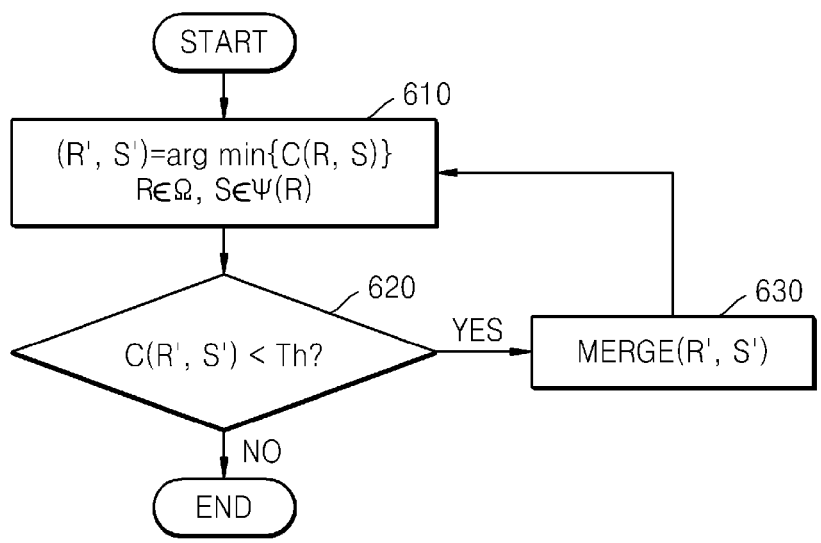
FIG. 6 is a flowchart of a merging process of image blocks, according to an exemplary embodiment.

FIG. 6 is a flowchart of a merging process of image blocks, according to an exemplary embodiment.

Referring to FIG. 6, in operation 610, the block merging unit 180 obtains C(R, S) that is a cost value based on a predetermined evaluation function, which has the smallest value when two blocks R and S are in the same object, with respect to R and S that are any two adjacent blocks (or a group of pixels). When $\Omega$ denotes an image area where block mergence is performed, the block merging unit 180 obtains C(R, S) by using a predetermined block R included in the image $\Omega$ and blocks S adjacent to the block R, which are defined as $\psi(R)$. In other words, the block merging unit 180 obtains C(R, S) of merged blocks obtained by merging all combinable adjacent blocks R and S included in the image $\Omega$, and selects blocks R' and S' having a minimum cost C(R, S) from among the merged blocks.

In operation 620, the block merging unit 180 compares a cost of a merged block determined to have a minimum cost with a predetermined threshold value Th. When the cost of the merged block having the minimum cost is lower than the predetermined threshold value Th based on a result of the comparing, the block merging unit 180 merges blocks in the merged block having the minimum cost in operation 630. Then, the block merging unit 180 determines the merged block as a new block, and again repeats processes of determining a merged block having a minimum cost from among merged blocks obtained by merging adjacent blocks in the image and merging blocks by comparing a cost of the determined merged block with the predetermined threshold value Th. Such processes of merging blocks are repeated while a cost of a merged block determined to have a minimum cost is lower than the predetermined threshold value Th. The block merging unit 180 no longer merges blocks included in a merged block and ends the merging process when a cost of a merged block having a minimum cost is equal to or higher than the predetermined threshold value Th.

Figure 7:
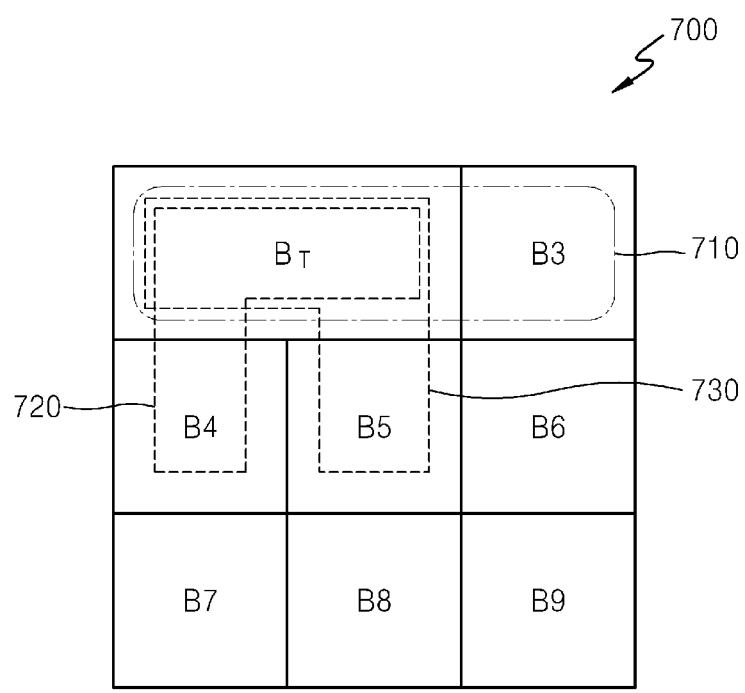
FIG. 7 is a reference diagram for describing a process of repeatedly merging image blocks, according to an exemplary embodiment.

FIG. 7 is a reference diagram for describing a process of repeatedly merging image blocks, according to an exemplary embodiment.

Referring to FIGS. 5 and 7, it is assumed that the B1+B2 merged block 511 from among the merged blocks 511 through 522 is a merged block having a minimum cost, and since a cost of the B1+B2 merged block 511 is lower than the predetermined threshold value Th, the block merging unit 180 finally obtained a merged block $B_T$ by merging the blocks B1 and B2. The block merging unit 180 assumes that the block $B_T$ as a new block, and calculates costs of merged blocks 710, 720, and 730 obtained by merging blocks adjacent to the block $B_T$ in addition to costs of the merged blocks 511 through 522 of FIG. 5. Then, the block merging unit 180 determines a merged block having a minimum cost from among costs of merged blocks $B_T$+B3 710, $B_T$+B4 720, $B_T$+B5 730, B4+B5 513, B5+B6 514, B7+B8 515, B8+B9 516, B3+B6 519, B4+B7 520, B5+B8 521, and B6+B9 522, determines whether a cost of the merged block having the minimum cost is lower than the predetermined threshold value Th, and determines whether to merge blocks in the merged block having the minimum cost. If it is assumed that the $B_T$+B3 710 has the minimum cost, the blocks $B_T$ and B3 are merged when the cost of the $B_T$+B3 710 is lower than the predetermined threshold value Th, and the blocks $B_T$ and B3 are not merged and determined to have the final split shapes shown in FIG. 7 when the cost of the $B_T$+B3 710 is equal to or higher than the predetermined threshold value Th, and thus a merging process is ended. In other words, as described above, the merging process is repeated only while a minimum cost from among costs of merged blocks obtained by merging adjacent blocks in an image that is currently processed is lower than the predetermined threshold value Th.

Meanwhile, when T denotes a merged block obtained by merging two adjacent blocks R and S, $V_T$ denotes a motion vector of the merged block, $V_R$ and $V_S$ respectively denote motion vectors of the blocks R and S, SAD(T, $V_T$) denotes a motion estimation error by the motion vector $V_T$ of the merged block T, SAD(R, $V_R$) denotes a motion estimation error by the motion vector $V_R$ of the block R, and SAD(S, $V_S$) denotes a motion estimation error by the motion vector $V_S$ of the block S, a cost C(R, S) may be obtained according to Equation 2 below.

$$C(R, S) = \frac{SAD(T, V_T) - \{SAD(R, V_R) + SAD(S, V_S)\}}{\{\Phi(R) + \Phi(S) - |V_R - V_S|\} - \Phi(T)} \quad (2)$$

In Equation 2, a function $\phi(X)$ is a function defined by Equation 3 below.

$$\Phi(X) = \sum_{Q \in \Pi} |V_X - V_Q| \quad (3)$$

In Equation 3, Π denotes a group of neighboring blocks adjacent to a block X and Q denotes one neighboring block included in Π. In other words, $\phi(X)$ is a sum of difference values between a motion vector $V_X$ of the block X and motion vectors $V_Q$ of the neighboring blocks Q, and indicates a degree of non-homogeneity of the motion vector of the block X and the motion vector of the neighboring block.

In Equation 2, a denominator is a difference between a degree of non-homogeneity between a motion vector of a merged block and motion vectors of neighboring blocks of the merged block, and a degree of non-homogeneity between a motion vector of each of blocks included in the merged block and a motion vector of each of neighboring blocks of the blocks, and indicates a homogeneity degree of a motion vector according to mergence. In other words, the denominator is a value obtained by quantifying a degree of motion vector uniformity by replacing two motion vectors into one motion vector of a merged block according to mergence. Two original motion vectors are replaced into one motion vector of a merged block via a merging process, and when homogeneity of a motion vector does not remarkably increase by mergence, the denominator of Equation 2 has a relatively small value, and thus a value of C(R, S) increases. Accordingly, when homogeneity of a motion vector does not remarkably increase by mergence, a homogeneity degree of a motion vector according to mergence is quantified and measured as in the denominator of Equation 2 so as not to perform mergence.

Also, in Equation 2, a numerator indicates a variation of a motion estimation error according to mergence. When blocks included in different objects are merged and have one motion vector, an SAD of a merged block is remarkably increased, and thus it is determined whether blocks to be merged exist in one object by calculating a difference between a motion estimation error by a merged block newly generated by mergence and a sum of motion estimation errors by two blocks before the mergence as in the numerator of Equation 2.

Also, referring to Equation 2, if C(R, S) is small, a motion vector field is further homogeneous without a large increase in a motion estimation error when blocks R and S are merged, and thus mergence is performed when C(R, S) is small. On the other hand, if C(R, S) is large, a motion vector field is not largely homogeneous but a motion estimation error largely increases, and thus adjacent blocks may not be merged. Accordingly, the block merging unit 180 measures a cost C(R, S) indicating (variation of motion estimation error by merged block)/(homogeneity degree of motion vector) based on a predetermined evaluation function like Equation 2 so as to measure possibility that two adjacent blocks R and S existing in one object and efficiency of a homogeneity degree of a motion vector according to mergence of the blocks R and S, thereby determining whether to merge adjacent blocks.

Meanwhile, in Equation 2, SAD(X, V) denotes a motion estimation error of a block X having a motion vector V, and may be obtained as Equation 4 below.

$$SAD(X, V) = \sum_{i=0}^{N-1} \sum_{j=0}^{M-1} |f_{t-1}(x_0 + V_x + i, y_0 + V_y + j) - f_{t+1}(x_0 + i, y_0 + j)| \quad (4)$$

In Equation 4, a size of the block X is N*M (N and M are each an integer), a first pixel location of the block X is (x0,y0), the motion vector V has a component of (Vx, Vy), $f_{t-1}$ denotes a reference frame, and $f_{t+1}$ denotes a current frame.

Figure 8:
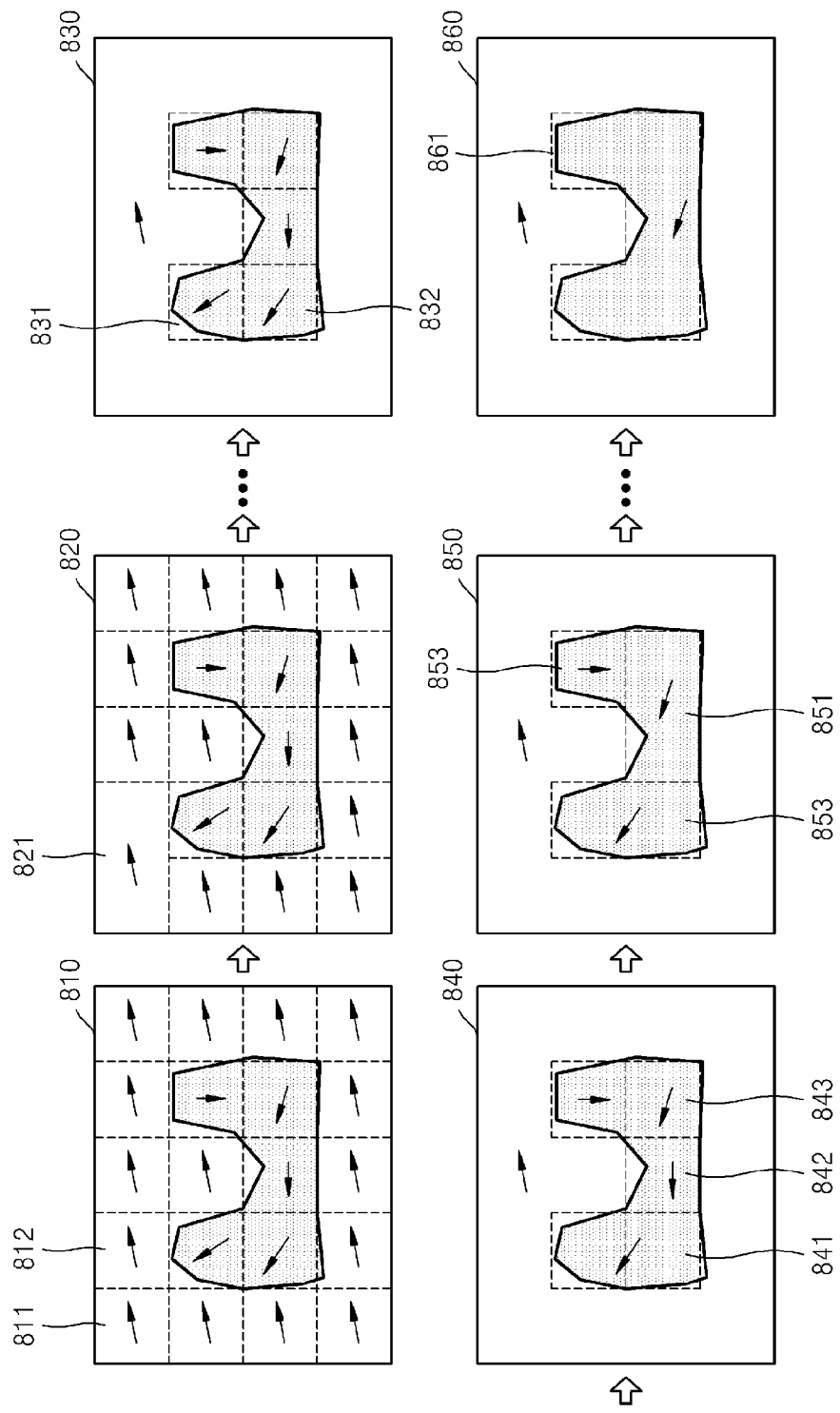
FIG. 8 is a diagram for describing a block merging process and a normalization process of a motion vector, according to an exemplary embodiment.

FIG. 8 is a diagram for describing a block merging process and a normalization process of a motion vector, according to an exemplary embodiment. FIG. 8 illustrates a case when a merging process is performed in an order from a first image 810 to a sixth image 860, wherein first through sixth images 810 through 860 sequentially show a merging process of blocks included in one image, not different images.

Referring to FIG. 8, the block merging unit 180 calculates C(R, S) by using Equation 2 described above for merged blocks obtained by merging all adjacent blocks in the first image 810, and determines mergence by comparing a cost of a merged block having a minimum cost with the predetermined threshold value Th. It is assumed that a merged block including initial adjacent blocks 811 and 812 has a minimum value that is lower than the predetermined threshold value Th. In this case, the initial adjacent blocks 811 and 812 are finally merged into one merged block 821, as shown in the second image 820. As described above with reference to FIGS. 5 through 7, such a merging process is repeatedly performed while a minimum cost of merged blocks is smaller than the predetermined threshold value Th. Referring to the third image 830, regions corresponding to a background are merged to one block having one motion vector via such a merging process. Also, adjacent blocks included in an object region displayed in shades may also be merged to one merged block via a merging process. In the third image 830, it is assumed that a merged block including blocks 831 and 832 has a minimum cost that is lower than the predetermined threshold value Th. In this case, as shown in the fourth image 840, the blocks 831 and 832 are finally merged to one merged block 841. Similarly, in the fourth image 840, when it is assumed that a merged block including blocks 842 and 843 has a minimum cost that is smaller than the predetermined threshold value Th, the blocks 842 and 843 are finally merged to one merged block 851 as shown in the fifth image 850. Similar merging processes are performed on blocks 851, 852, and 853 included in one object of the fifth image 850, and thus one merged block similar to a shape of the object may be obtained as in a merged block 861 of the sixth image 860. As such, blocks having wrong motion vectors in the same object may be merged to one merged block to have one motion vector via a merging process of blocks and a normalization process of a motion vector, according to an exemplary embodiment, and thus a motion vector close to actual motion may be obtained.

Figure 9:
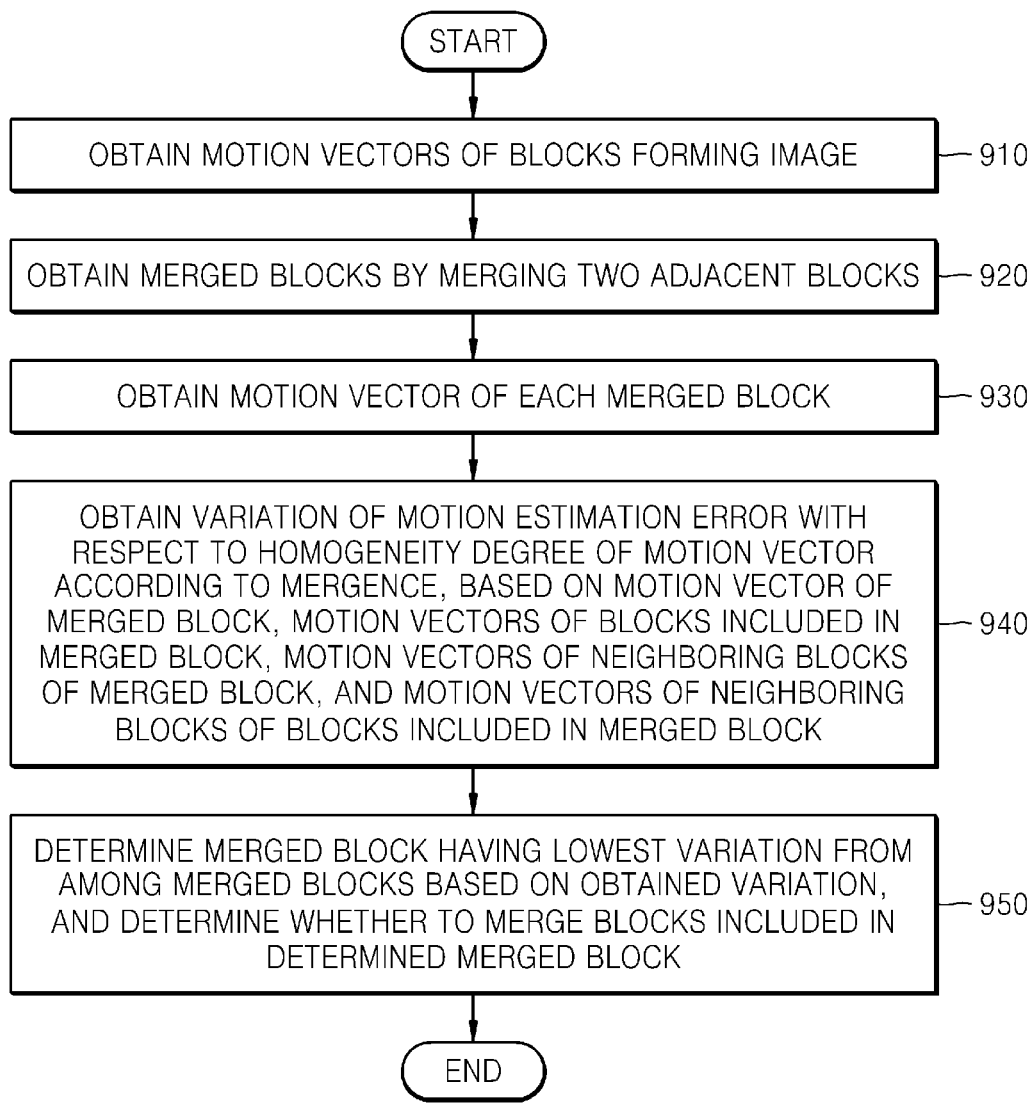
FIG. 9 is a flowchart of an image encoding method according to an exemplary embodiment.

FIG. 9 is a flowchart of an image encoding method according to an exemplary embodiment.

Referring to FIGS. 1 and 9, in operation 910, the motion estimation and compensation unit 170 obtains motion vectors of blocks forming an image. A block may indicate one of a macroblock, a partition obtained by splitting a macroblock, and a coding unit used in HEVC.

In operations 920 and 930, the motion estimation and compensation unit 170 also obtains a motion vector of a merged block obtained by merging two adjacent blocks from among the blocks forming the image, by performing motion estimation on the merged block. As described above, the merged blocks may be obtained by merging all combinable two adjacent blocks included in the image.

In operation 940, the block merging unit 180 obtains a variation of a motion estimation error with respect to a homogeneity degree of a motion vector according to mergence with respect to a merged block, based on the motion vector of the merged block, motion vectors of blocks included in the merged block, motion vectors of neighboring blocks of the merged block, and motion vectors of neighboring blocks of the blocks included in the merged block.

As described above, the block merging unit 180 measures a cost indicating (variation of motion estimation error by merged block)/(homogeneity degree of motion vector) based on a predetermined evaluation function like Equation 2 so as to measure possibility that two adjacent blocks existing in one object and efficiency of a homogeneity degree of a motion vector according to mergence of the adjacent blocks, thereby determining whether to merge the adjacent blocks.

In operation 950, the block merging unit 180 determines a merged block having a lowest variation from among merged blocks, based on the obtained variation, i.e., the cost of Equation 2, and determines whether to merge blocks included in the determined merged block. As described above, the block merging unit 180 compares the obtained variation with a predetermined threshold value, and merges the blocks included in the determined merged block when the obtained variation is lower than the predetermined threshold value, and does not merge the blocks included in the merged block and maintains original blocks when the obtained variation is equal to or higher than the predetermined threshold value.

Figure 10:
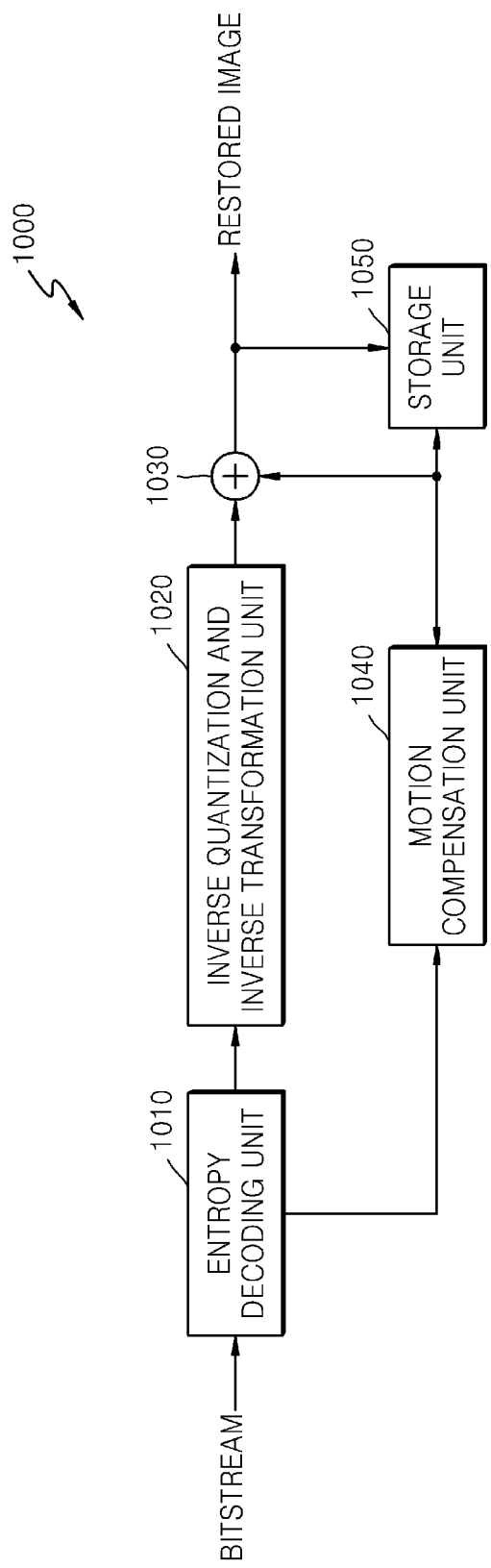
FIG. 10 is a block diagram of an image decoding apparatus according to an exemplary embodiment.

FIG. 10 is a block diagram of an image decoding apparatus according to an exemplary embodiment.

Referring to FIG. 10, an image decoding apparatus 1000 includes an entropy decoding unit 1010, an inverse quantization and inverse transformation unit 1020, a restoring unit 1030, a motion compensation unit 1040, and a storage unit 1050.

The entropy decoding unit 1010 entropy-decodes a received bitstream, and extracts estimation mode information and image data of a current block to be decoded form the bitstream. In detail, the entropy decoding unit 1010 according to an exemplary embodiment obtains and outputs information about a merged block obtained by merging at least two adjacent blocks from among blocks forming an image, and about a motion vector of the merged block, from the received bitstream.

The inverse quantization and inverse transformation unit 1020 inverse-quantizes and inverse-transforms, and then outputs residual data that is entropy-decoded. The motion compensation unit 1040 performs motion compensation on the merged block by using the obtained motion vector of the merged block to obtain an estimation value of the merged block. Blocks other than the merged block may be estimated according to a general block estimation method.

The restoring unit 1030 restores an image by adding the residual data of the merged block and the estimation value. The storage unit 1050 stores a previous restored image as a reference frame for decoding a subsequent image.

Figure 11:
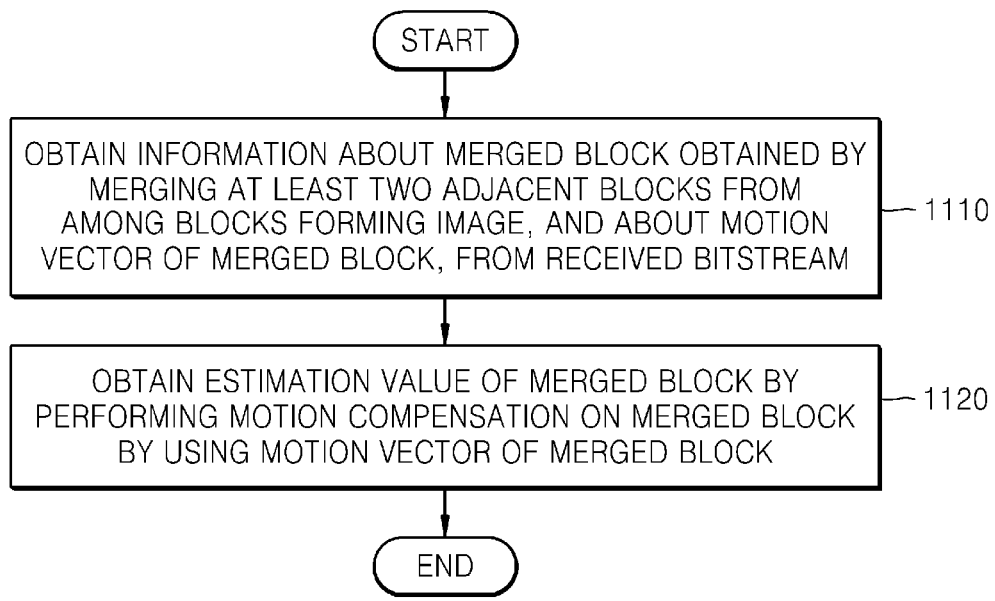
FIG. 11 is a flowchart of an image decoding method according to an exemplary embodiment.

FIG. 11 is a flowchart of an image decoding method according to an exemplary embodiment.

Referring to FIGS. 10 and 11, in operation 1110, the entropy decoding unit 1010 obtains information about a merged block obtained by merging at least two adjacent blocks from among blocks forming an image, and about a motion vector of the merged block, from a received bitstream. As described above, the merged block is obtained by merging adjacent blocks based on a result of comparing a predetermined threshold value with a variation of a motion estimation error with respect to a homogeneity degree of a motion vector by merging at least two adjacent blocks during an encoding process.

In operation 1120, the motion compensation unit 1040 obtains an estimation value of the merged block by performing motion compensation on the merged block by using the motion vector of the merged block. When the estimation value of the merged block is generated, residual data of the merged block obtained via an inverse quantization and inverse transformation process is added to the estimation value to restore the merged block.

Figure 12:
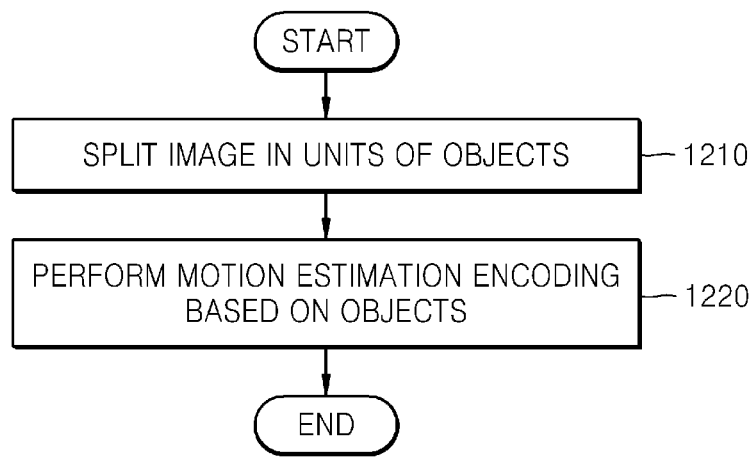
FIG. 12 is a flowchart of an image encoding method according to another exemplary embodiment.

FIG. 12 is a flowchart of an image encoding method according to another exemplary embodiment.

As described above, since motion estimation is performed in units of blocks having a predetermined size without considering an object included in an image according to a BMA-based motion estimation method, accuracy and precision of the motion estimation are decreased. Accordingly, the image encoding method according to the other exemplary embodiment splits pixels included in a current frame into objects based on pixel values before motion estimation, and performs motion estimation and compensation based on units of the objects. In other words, the image encoding method according to the other exemplary embodiment groups adjacent pixels having similar pixel values to one object, and performs motion estimation in units of objects having the similar pixel values.

In detail, referring to FIG. 12, in operation 1210, adjacent pixels having similar pixel values are grouped to one pixel group based on pixel values of pixels included in a current frame, before motion estimation. In other words, an image is split into objects obtained by grouping adjacent pixels having similar pixel values. According to another exemplary embodiment, an object denotes a group of pixels having similar pixel values. Since pixels included in one object may have different pixel values, one object may also be split into a plurality of objects. For example, let's assume that there is an object having green and black patterns, like a watermelon. In this case, according to the image encoding method according to the other exemplary embodiment, one object is formed by grouping adjacent pixels having pixel values similar to black, and one object is formed by grouping adjacent pixels having pixel values similar to green. In other words, according to another exemplary embodiment, one object may be classified into a plurality of objects based on a pixel value.

In operation 1220, when the image is split into the objects based on the pixel values, motion estimation and compensation is performed in units of the objects. According to another exemplary embodiment, since a motion vector is obtained in units of objects obtained by grouping adjacent pixels having similar pixel values, accuracy of the motion vector may be increased.

Figure 13:
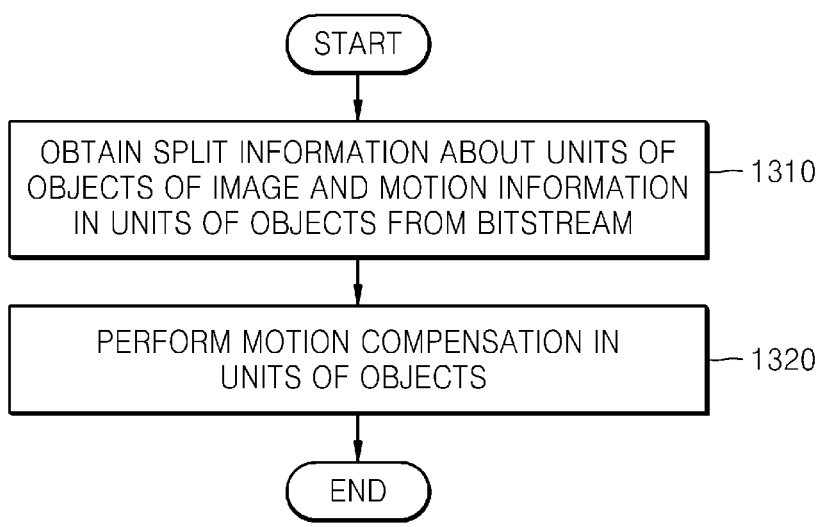
FIG. 13 is a flowchart of an image decoding method according to another exemplary embodiment.

FIG. 13 is a flowchart of an image decoding method according to another exemplary embodiment.

Referring to FIG. 13, in operation 1310, split information about units of objects obtained by grouping adjacent pixels having similar pixel values, and motion vector information in the units of objects are obtained from a bitstream. In operation 1320, motion compensation is performed in units of objects by using the obtained motion vector to generate an estimation value of the objects obtained by grouping the adjacent pixels having the similar pixel values. Since the image encoding and decoding methods according to the other exemplary embodiments may be performed similar to block-based image encoding and decoding methods, except the difference that the image encoding and decoding methods according to the other exemplary embodiments use objects obtained by grouping adjacent pixels having similar pixel values instead of blocks, details thereof are omitted herein.

The exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. While not record in all aspects, one or more units of the image encoding and image decoding apparatus may include a processor or microprocessor that executes a computer program stored in a computer readable medium.

While exemplary embodiments have been particularly shown and described with reference to drawings, it will be understood by those of ordinary skill in the art that various changes in form and details may be made therein without departing from the spirit and scope of the inventive concept as defined by the appended claims. The embodiments should be considered in a descriptive sense only and not for purposes of limitation. Therefore, the scope of the inventive concept is defined not by the detailed description but by the appended claims.

What is claimed:

1. An image encoding method comprising:
obtaining motion vectors of blocks forming an image;
obtaining merged blocks by merging adjacent blocks;
obtaining a motion vector of each of the merged blocks;
obtaining a variation of a motion estimation error with respect to a homogeneity degree of motion vectors according to mergence with respect to each of the merged blocks, based on the motion vector of each of the merged blocks, motion vectors of the adjacent blocks included in each of the merged blocks, motion vectors of neighboring blocks of each of the merged blocks, and motion vectors of neighboring blocks of the adjacent blocks included in each of the merged blocks; and
determining a merged block having a smallest variation from among the merged blocks, and determining whether to merge blocks included in the determined merged block, based on the obtained variation.

2. The image encoding method of claim 1, wherein the obtaining of the variation comprises:
obtaining a homogeneity degree of a motion vector by using the motion vectors of the adjacent blocks included in each of the merged blocks, the motion vectors of the neighboring blocks of each of the merged blocks, and the motion vectors of the neighboring blocks of the adjacent blocks included in each of the merged blocks, wherein the homogeneity degree indicates a difference between a degree of non-homogeneity between the motion vector of each of the merged blocks and the motion vectors of the neighboring blocks of each of the merged blocks, and a degree of non-homogeneity between each of the motion vectors of the adjacent blocks included in each of the merged blocks and each of the motion vectors of the neighboring blocks of the adjacent blocks included in each of the merged blocks;
obtaining a variation of a motion estimation error, which indicates a difference between a motion estimation error by the motion vector of each of the merged blocks and a motion estimation error by each of the motion vectors of the adjacent blocks included in each of the merged blocks; and
obtaining the variation of the motion estimation error with respect to the homogeneity degree of the motion vector according to the mergence, by dividing the obtained variation by the obtained homogeneity degree.

3. The image encoding method of claim 2, wherein, when T denotes a merged block from among each of the merged blocks, R and S respectively denote two blocks included in the merged block T, $V_T$ denotes the motion vector of the merged block T, $V_R$ and $V_S$ respectively denote motion vectors of the two blocks R and S, SAD(T, $V_T$) denotes a motion estimation error by the motion vector $V_T$ of the merged block T, SAD(R, $V_R$) denotes a motion estimation error by the motion vector $V_R$ of the block R, SAD(S, $V_S$) denotes a motion estimation error by the motion vector $V_S$ of the block S, $\phi(X)$ denotes a function for obtaining a degree of non-homogeneity of a motion vector of a block X and a motion vector of a neighboring block of the block X, which is obtained according to an equation $$\Phi(X) = \sum_{Q \in \Pi} |V_X - V_Q|,$$

wherein $\Pi$ denotes a group of neighboring blocks of the block X and Q denotes one neighboring block included in the group $\Pi$, and C(R, S) denotes a variation of a motion estimation error with respect to a homogeneity degree of the motion vector of the merged block T obtained by emerging the blocks R and S, C(R, S) is obtained according to a following equation;

$$C(R, S) = \frac{SAD(T, V_T) - \{SAD(R, V_R) + SAD(S, V_S)\}}{\{\Phi(R) + \Phi(S) - |V_R - V_S|\} - \Phi(T)}.$$

4. The image encoding method of claim 1, wherein the determining comprises comparing the obtained variation with a predetermined threshold value, and merging the blocks included in the determined merged block when the obtained variation is smaller than the predetermined threshold value, and maintaining an original block without merging the blocks included in the determined merged block when the obtained variation is equal to or higher than the predetermined threshold value.

5. The image encoding method of claim 1, wherein operations of the image encoding method are repeatedly performed while the obtained variation is lower than the predetermined threshold value.

6. The image encoding method of claim 1, further comprising encoding mergence information of the blocks and motion vector information of the merged blocks, in a bitstream obtained by encoding the image.

7. An image encoding apparatus comprising:
a motion estimator and compensator that is configured to obtain motion vectors of blocks forming an image, and a motion vector of each of merged blocks obtained by merging adjacent blocks; and
a block merger that is configured to obtain a variation of a motion estimation error with respect to a homogeneity degree of a motion vector according to mergence with respect to each of the merged blocks, based on the motion vector of each of the merged blocks, motion vectors of the adjacent blocks included in each of the merged blocks, motion vectors of neighboring blocks of each of the merged blocks, and motion vectors of neighboring blocks of the adjacent blocks included in each of the merged blocks, and determine, based on the obtained variation, a merged block having a smallest variation from among the merged blocks and whether to merge blocks included in the determined merged block.

8. An image decoding method comprising:
obtaining information about a merged block obtained by merging adjacent blocks from among blocks forming an image and about a motion vector of the merged block, from a received bitstream; and
obtaining an estimation value of the merged block by performing motion compensation on the merged block by using the motion vector,
wherein the merged block is obtained by merging the adjacent blocks based on a result of comparing a variation of a motion estimation error with respect to a homogeneity degree of a motion vector according to the merging of the adjacent blocks with a predetermined threshold value.

9. The image decoding method of claim 8, wherein the variation is obtained by dividing a variation of a motion estimation error indicating a difference between a motion estimation error by the motion vector of the merged block and a motion estimation error by a motion vector of each of the adjacent blocks included in the merged block by a homogeneity degree of a motion vector indicating a difference between a degree of non-homogeneity between the motion vector of the merged block and motion vectors of neighboring blocks of the merged block, and a homogeneity degree between the motion vector of each of the adjacent blocks included in the merged block and a motion vector of each of neighboring blocks of the blocks forming the image.

10. The image decoding method of claim 9, wherein, when T denotes the merged block, R and S respectively denote two blocks included in the merged block, $V_T$ denotes the motion vector of the merged block, $V_R$ and $V_S$ respectively denote motion vectors of the two blocks R and S, $SAD(T, V_T)$ denotes a motion estimation error by the motion vector $V_T$ of the merged block T, $SAD(R, V_R)$ denotes a motion estimation error by the motion vector $V_R$ of the block R, $SAD(S, V_S)$ denotes a motion estimation error by the motion vector $V_S$ of the block S, $\phi(X)$ denotes a function for obtaining a degree of non-homogeneity of a motion vector of a block X and a motion vector of a neighboring block of the block X, which is obtained according to an equation $$\Phi(X) = \sum_{Q \in \Pi} |V_X - V_Q|,$$

wherein $\Pi$ denotes a group of neighboring blocks of the block X and Q denotes one neighboring block included in the group $\Pi$, and C(R, S) denotes a variation of a motion estimation error with respect to a homogeneity degree of the motion vector of the merged block T obtained by emerging the blocks R and S, C(R, S) is obtained according to a following equation;

$$C(R, S) = \frac{SAD(T, V_T) - \{SAD(R, V_R) + SAD(S, V_S)\}}{\{\Phi(R) + \Phi(S) - |V_R - V_S|\} - \Phi(T)}.$$

11. The image decoding method of claim 8, wherein the merged block is obtained by comparing the obtained variation and the predetermined threshold value, and merging the adjacent blocks included in the merged block when the obtained variation is lower than the predetermined threshold value.

12. An image decoding apparatus comprising:
an entropy decoder that is configured to obtain information about a merged block obtained by merging adjacent blocks from among blocks forming an image and about a motion vector of the merged block, from a received bitstream; and
a motion compensator that is configured to obtain an estimation value of the merged block by performing motion compensation on the merged block by using the motion vector,
wherein the merged block is obtained by merging the adjacent blocks based on a result of comparing a variation of a motion estimation error with respect to a homogeneity degree of a motion vector according to the merging of the adjacent blocks with a predetermined threshold value.

13. A non-transitory computer-readable recording medium having recorded thereon a program for executing a method of claim 1.

14. A non-transitory computer-readable recording medium having recorded thereon a program for executing a method of claim 8.

15. An image encoding method comprising:
obtaining a variation of a motion estimation error with respect to a homogeneity degree of a motion vector according to mergence with respect to a merged block, based on the motion vector of the merged block, motion vectors of adjacent blocks included in the merged block, motion vectors of neighboring blocks of the merged block, and motion vectors of neighboring blocks of the adjacent blocks included in the merged block;

determining a merged block having a smallest variation from among merged blocks on which the obtaining is performed; and determining whether to merge blocks included in the determined merged block, based on the obtained variation.

16. The image encoding method of claim 15, wherein the obtaining of the variation comprises:

obtaining a homogeneity degree of a motion vector by using the motion vectors of the adjacent blocks included in the merged block, the motion vectors of the neighboring blocks of the merged block, and the motion vectors of the neighboring blocks of the adjacent blocks included in the merged block, wherein the homogeneity degree indicates a difference between a degree of non-homogeneity between the motion vector of the merged block and the motion vectors of the neighboring blocks of the merged block, and a degree of non-homogeneity between each of the motion vectors of the adjacent blocks included in the merged block and each of the motion vectors of the neighboring blocks of the adjacent blocks included in the merged block.

17. The image encoding method of claim 16, wherein the obtaining of the variation further comprises:

obtaining a variation of a motion estimation error, which indicates a difference between a motion estimation error by the motion vector of the merged block and a motion estimation error by each of the motion vectors of the adjacent blocks included in the merged blocks and obtaining the variation of the motion estimation error with respect to the homogeneity.

18. The image encoding method of claim 15, further comprising encoding mergence information of the merged block in a bitstream.

* * * * *